(12) United States Patent
Deck et al.

(10) Patent No.: US 7,620,637 B2
(45) Date of Patent: Nov. 17, 2009

(54) BUSINESS OBJECT SUMMARY PAGE

(75) Inventors: Ingo Deck, Mannheim (DE); Markus Backes, Saarbrücken (DE); Gotthard Goetzinger, Eppelborn (DE)

(73) Assignee: SAP AG, Walldorf (DE)

( * ) Notice: Subject to any disclaimer, the term of this patent is extended or adjusted under 35 U.S.C. 154(b) by 387 days.

(21) Appl. No.: 11/637,530

(22) Filed: Dec. 12, 2006

(65) Prior Publication Data

US 2008/0140624 A1    Jun. 12, 2008

(51) Int. Cl.
*G06F 17/00* (2006.01)

(52) U.S. Cl. .................. 707/10; 707/100; 707/102; 707/103 R; 707/104.1; 707/203

(58) Field of Classification Search .............. 707/3, 707/102, 10, 103 R, 104.1, 203; 84/609; 725/52; 704/233; 705/30; 715/205; 709/206
See application file for complete search history.

(56) References Cited

U.S. PATENT DOCUMENTS

| | | | | |
|---|---|---|---|---|
| 5,708,825 | A * | 1/1998 | Sotomayor | 715/205 |
| 5,983,176 | A * | 11/1999 | Hoffert et al. | 704/233 |
| 6,161,102 | A * | 12/2000 | Yanagihara et al. | 707/3 |
| 6,240,421 | B1 * | 5/2001 | Stolarz | 707/102 |
| 2002/0111887 | A1 * | 8/2002 | McFarlane et al. | 705/30 |
| 2003/0004979 | A1 * | 1/2003 | Woodring | 707/203 |
| 2004/0243588 | A1 * | 12/2004 | Tanner et al. | 707/100 |
| 2007/0061402 | A1 * | 3/2007 | Mehr et al. | 709/206 |
| 2007/0100834 | A1 * | 5/2007 | Landry et al. | 707/10 |
| 2007/0169613 | A1 * | 7/2007 | Kim et al. | 84/609 |
| 2007/0180471 | A1 * | 8/2007 | Unz | 725/52 |
| 2007/0255751 | A1 * | 11/2007 | Bansal et al. | 707/103 R |
| 2007/0299860 | A1 * | 12/2007 | Westman et al. | 707/102 |

OTHER PUBLICATIONS

Thomas Haigh, "A Verietable Bucket of Facts" Origins of the Database Management System, ACM, Jun. 2006, pp. 33-49.*
Hamid Abdul Basit et al., "Detecting Higher-level Similarity Patterns in Programs", ACM, 2005, pp. 156-165.*

* cited by examiner

*Primary Examiner*—Thuy N Pardo
(74) *Attorney, Agent, or Firm*—Mintz, Levin, Cohn, Ferris, Glovsky and Popeo, P.C.

(57) ABSTRACT

A method for displaying a summary page for a business object to a user includes storing a plurality of business objects within a business object database. A plurality of predefined summary page definition files are stored within a definition file database. Each of the summary page definition files provide information pertaining to a summary page. A desired business object is selected from the business object database. A summary page is displayed based on the business object from the business object database, a corresponding summary page definition file from the definition file database, and a user role of the user.

39 Claims, 3 Drawing Sheets

BUSINESS OBJECT SUMMARY PAGE

TECHNICAL FIELD

The present disclosure relates to a summary page and, more specifically, to a business object summary page.

DESCRIPTION OF THE RELATED ART

Business objects are database entries (objects) containing one or more fields that are used to represent an entity of business practice. The types of business objects that an enterprise stores in their database may depend on the business endeavor of the enterprise. For example, a business engaged in the purchasing and selling of goods may store business objects such as purchase orders, invoices and sales orders.

As database objects, the various fields of business objects must remain populated with current data. Generation of a business object therefore includes the selection of the business object type and the entry of the appropriate data. A business object may contain a large number of fields of information so that the business objects may be flexible. These fields may be organized into one or more sections called "tabs" in reference to the selectable tabs that allow a user to enter information for the given section of fields.

As a wide variety of users with distinct job functions may all have an interest in the same business objects, various fields have varying degrees of significance for various users.

Once generated, business objects may be searched for, viewed, changed, deleted or otherwise utilized. Often it can be difficult to identify the desired business object, for example, after a search, because the large number of tabs and fields obscures the significance of the business object. For example, a user wishing to identify a desired business object may have to navigate through multiple tabs before enough insight can be gained to determine whether the searched business object is the desired business object. This problem may be further exacerbated by the fact that a search for a desired business object may return many business objects that must each be explored in detail before the correct identification can be made.

It is therefore desirable to provide an approach for the fast and accurate display of business objects.

SUMMARY

A method for displaying a summary page for a business object to a user includes providing access to at least one business object within a business object database. Access is provided to at least one predefined summary page definition file within a definition file database. Each of the summary page definition files provide information pertaining to a summary page. A desired business object is selected from the business object database. A summary page is displayed based on the business object from the business object database, a corresponding summary page definition file from the definition file database, and a user role of the user.

A system for displaying a summary page for a business object to a user includes a business object database for storing a plurality of business objects. A plurality of predefined summary page definition files are stored within a definition file database. Each of the summary page definition files provide information pertaining to a summary page. A selecting unit selects a desired business object from the business object database. A displaying unit displays the summary page based on the business object from the business object database, a corresponding summary page definition file from the definition file database, and a user role of the user.

A computer system includes a processor and a program storage device readable by the computer system. The program storage device embodies a program of instructions executable by the processor to perform method steps for displaying a summary page for a business object to a user. The method includes providing access to at least one business object within a business object database. Access is provided to at least one predefined summary page definition file within a definition file database. Each of the summary page definition files provide information pertaining to a summary page. A desired business object is selected from the business object database. A summary page is displayed based on the business object from the business object database, a corresponding summary page definition file from the definition file database, and a user role of the user.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
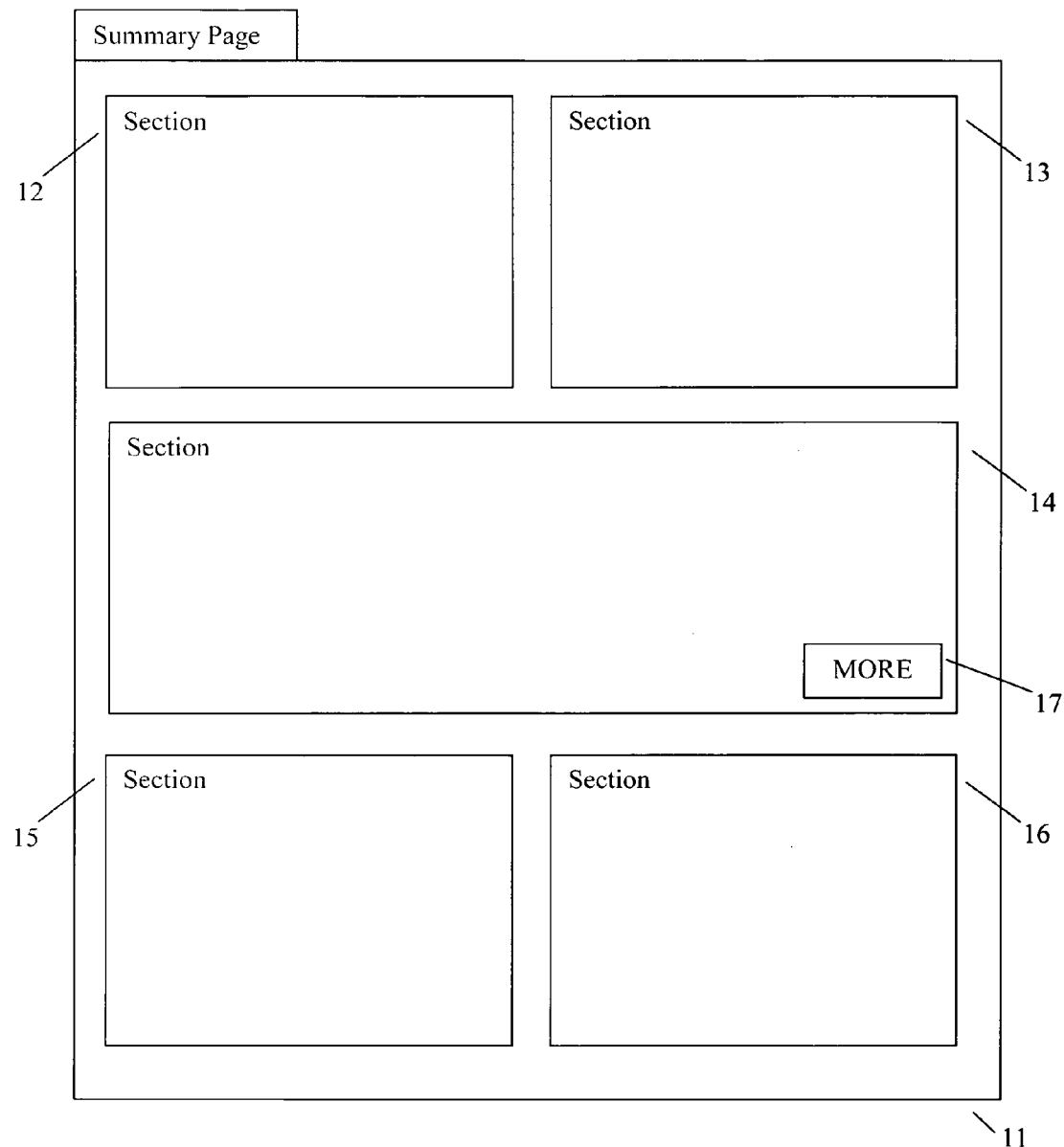
FIG. 1 shows a model summary page layout according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure seek to provide a fast and accurate system and method for the display of business objects by utilizing a business object summary page to present only those fields that would be of the highest relevance to the user seeking to view the business object.

Such a summary page may be used to quickly view a business object without or with minimal navigation. This feature may be especially practical when a user quickly reviews multiple business objects, for example, when looking through query results.

Embodiments of the present disclosure may be used with all forms of business objects including, for example, business objects relating to Customer Relationship Management (CRM) applications. For example, business objects may be used to represent the following: campaigns, leads, sales quotations, sales orders, sales contract, opportunities, accounts, cases, channels, partners, contacts, marketing planners, service contracts, self-service, internet sales, contact person, activity, tasks, target groups, conditions, complaint, service orders, etc.

The business object summary page may display important information from fields within one or more tabs. By looking at the business object summary page, a user can easily identify whether the summarized business object is the desired business object without having to navigate through multiple tabs.

FIG. 1 shows a model summary page layout according to an embodiment of the present disclosure.

The business object summary page 11 may be an entire screen or a section of a screen. For example, search results may be listed on one half of the screen while the business object summary for a business object on the list may be displayed in the other half of the screen. Alternatively, the business object summary page may be a full screen or a moveable and scalable window on the screen.

The business object summary page 11 may be divided into one or more sections 12-16. Each section may represent a category of information relating to the summarized business object. For example, each section may represent key fields taken from a single tab. The one or more sections may be displayed on the summary page, for example, in cells of rows and columns. The size and position (prominence) of each cell may depend on the length and importance of the information it displays.

Each cell may be displayed, for example, as an iView. An iView is a program that retrieves data from content sources, for example, the enterprise database and/or the internet, and displays the retrieved data in a portal, for example, a web portal used as the user's client interface.

The business object summary page may therefore retrieve key fields of information within one or more tabs of the summarized business object and display this information in a meaningful fashion to allow for the quick and accurate understanding of the substance of the summarized business object. The summary page may be read-only to prevent casual modification of data. The summary page may include one or more links that allow a user to quickly and easily call up the desired business object for greater detail and/or modification. The link may be in the form of a hyper-link displayed in bold print in one of the sections 12-16 of the summary page 11. For example, a user may wish to see more about particular information included in the business object summary and may select the particular information for further detail by clicking on the bolded print in that section of the summary page. The business object may then be recalled and opened to the tab where that information originated.

The business object summary page may include a limited selection of key information. By limiting the amount of information displayed, the summary page may be streamlined for both simplified interpretation and fast performance.

The summary page may also include options for providing additional information about the summarized business object. For example, a "more" button 17 may be displayed so that the user may easily obtain more information about a particular category of information presented in the summary page.

These "more" buttons may navigate to the standard display of the business object or they may lead to other summary pages depending on how the particular summary page has been defined.

As stated above, business object summary pages according to embodiments of the present disclosure may be used to provide a summary of business objects resulting from a query. Alternatively, business object summary pages may be used when a user calls up a particular business object. A user may have one or more business objects assigned to that user and summary pages may be shown for such business objects, for example, when the user first accesses the CRM system.

The substance and style of the business object summary page may be defined, for example, as part of the definition of the business object type. The substance and style of the business object summary page may therefore be a function of the business object type.

Individual users have different roles within the organization. Accordingly, the information of a business object that may be most useful to one user may be different than the information of a business object that may be most useful to another user. For example, a user who is a marketing professional may be most interested in a customer's order history and demographics while a user who is an accounting professional may be most interested in the customer's invoice value.

To accommodate this, the substance and style of the business object summary page for a given type of business object may be dependent on the role of the user who is viewing the business object. Accordingly, a single business object may have multiple summary page configurations with each summary page configuration corresponding to a particular user role. When a user requests information, the user is queried to input their name and/or user role. If only the user's name is input, the user's role can be determined by querying, for example, an HR database. Once the user's role is input or determined, the appropriate summary page configuration can be retrieved.

Figure 2:
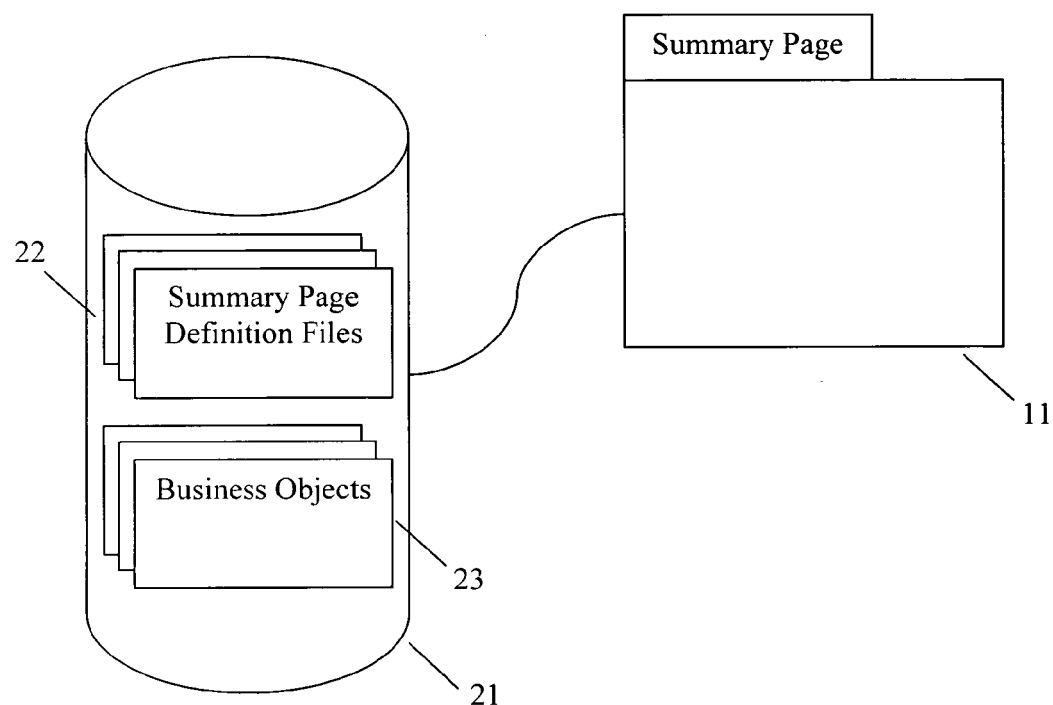
FIG. 2 is a diagram showing a system for providing summary pages according to an embodiment of the present disclosure.

FIG. 2 is a diagram showing a system for providing summary pages according to an embodiment of the present disclosure.

The business object summary page 11 for each business object type and/or for each user role may be predefined, for example, by an administrator and/or expert. These definitions may be stored, for example, in the database 21 as summary page definition files 22. The summary page definition files 22 may be stored in the same database 21 that the business objects 23 are stored in. Alternatively, another database 21 may be used to store the summary page definition files 22. Summary pages may also be customized, for example, for each user, so that a particular user may quickly gain maximum information from even a quick look at a summary page.

Summary page definition files may provide such details as how the summary page is to look, what fields will be displayed, how prominently particular fields are displayed, and how the summary page is to be navigated (the navigation scheme). For example, the navigation scheme may indicate whether drilling down on a particular field of information navigates to the conventional business object view or to another summary page.

Each business object may have one or more summary page definition files. For example, each business object may have a summary page definition file for each possible user role. Alternatively, a single summary page definition file may include information on how to display a summary page for multiple different user roles. User-specific customizations may be stored in the summary page definition files or in separate user customization files.

Data displayed on summary pages according to embodiments of the present disclosure need not be limited to business object fields. Summary pages may include charts, graphs, and/or statistical calculations that may help to give a user an overview of the substance of the business object.

Summary pages may also include information from other business objects and/or other external sources that may help to give the displayed information some perspective.

Summary pages may be created as needed or they may be created and stored. Summary pages may be periodically updated, updated on-demand or continuously updated depending on the specific needs of the user and system efficiency considerations.

Figure 3:
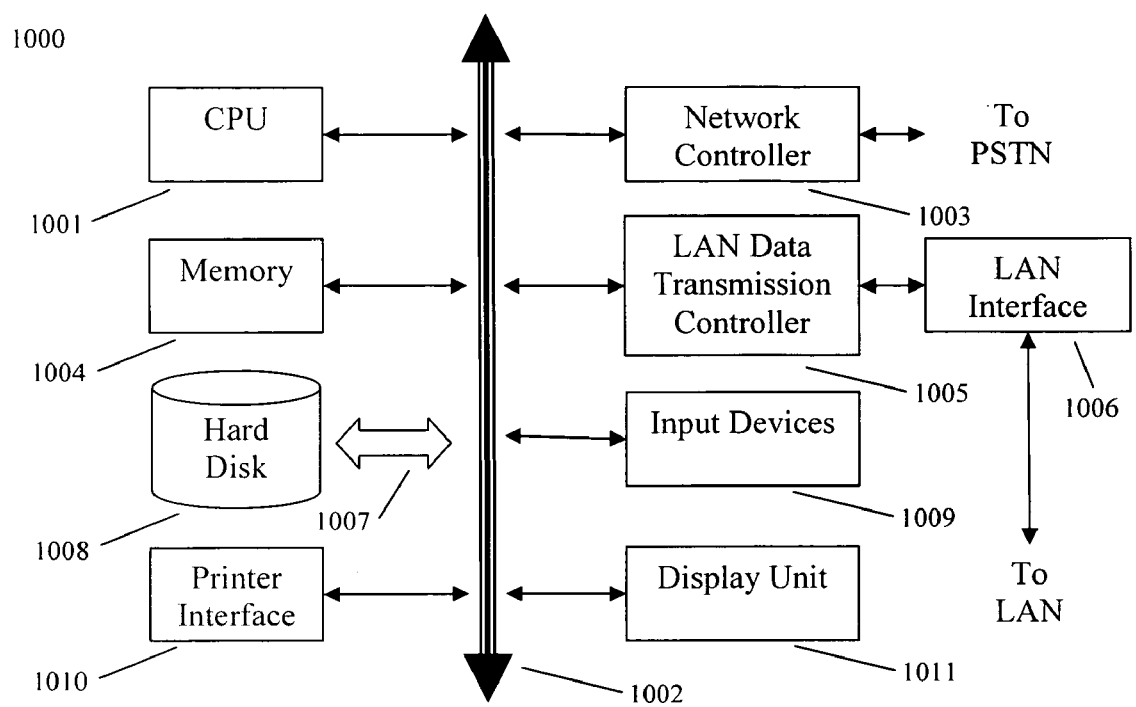
FIG. 3 shows an example of a computer system capable of implementing the method and apparatus according to embodiments of the present disclosure.

FIG. 3 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for displaying a summary page for a business object to a user, comprising:
   receiving input generated by a first user selecting a desired business object from a business object database;
   accessing at least one business object within a business object database based on the user-generated selection, the business object comprising a plurality of fields of data;
   querying a database to determine that the first user has a first role, the first role being one of a plurality of roles;
   accessing at least one predefined summary page definition file within a definition file database based on the user-generated selection, each of the summary page definition files providing information pertaining to a summary page including a layout of the summary page and a selection of fields from the business object to display in the summary page, the fields displayed differing for the first user with the first role from a second user with a second role different than the first role; and
   displaying a summary page based on the business object from the business object database, the layout and fields from the business object displayed on the summary page being based on a corresponding summary page definition file from the definition file database, and a user role of the user, at least one of the layout and fields differing based on whether the user is the first user or the second user.

2. The method of claim 1, wherein a single database is used as the business object database and the definition file database.

3. The method of claim 1, further comprising executing a query returning one or more business objects as the result of the query and wherein the user-generated input selects one of the business objects returned as the result of the query.

4. The method of claim 1, wherein information displayed on the summary page may be selected so that additional information relating to the selected information may be displayed by displaying the business object or by displaying a second summary page.

5. The method of claim 1, wherein displaying the summary page based on the business object, the corresponding summary page definition file, and a user role includes selecting data from the business object to be displayed in the summary page as predetermined by the summary page definition file.

6. The method of claim 1, wherein displaying the summary page based on the business object, the corresponding summary page definition file, and a user role includes selecting data from the business object to be displayed in the summary page based on data predetermined to be relevant for a user of the particular user role.

7. The method of claim 1, wherein displaying the summary page based on the business object, the corresponding summary page definition file, and a user role includes arranging the display of data in the summary page as predetermined by the summary page definition file.

8. The method of claim 1, wherein displaying the summary page based on the business object, the corresponding summary page definition file, and a user role includes arranging the display of data in the summary page based on an arrangement predetermined to be appropriate for a user of the particular user role.

9. The method of claim 1, wherein displaying the summary page based on the business object, the corresponding summary page definition file, and a user role includes defining a navigation scheme as predetermined by the summary page definition file.

10. The method of claim 1, wherein displaying the summary page based on the business object, the corresponding summary page definition file, and a user role includes defining a navigation scheme predetermined to be appropriate for a user of the particular user role.

11. The method of claim 1, wherein the display of the summary page may be personalized for a particular user.

12. The method of claim 1, wherein the summary page is presented in a graphical user interface and includes at least one link, the link, when activated, presenting additional fields for the corresponding business object than are displayed in the summary page.

13. A system for displaying a summary page for a business object to a user, comprising:
   a business object database for storing a plurality of business objects;
   a user database defining a role among of a plurality of roles for each user;
   a definition file database for storing a plurality of predefined summary page definition files, each of the summary page definition files providing information pertaining to a summary page including a layout of the summary page and a selection of fields from the business object to display in the summary page, the fields displayed differing for a first user with a first role from a second user with a second role different than the first role;
   a selecting unit for selecting a desired business object from the business object database;
   a displaying unit for displaying a summary page based on the business object from the business object database, the layout and fields from the business object displayed on the summary page being based on a corresponding summary page definition file from the definition file database, and a user role of the user as determined by querying the user database, at least one of the layout and fields differing based on whether the user is the first user or the second user.

14. The system of claim 13, wherein a single database is used as the business object database and the definition file database.

15. The system of claim 13, additionally comprising a query execution unit for executing a query and returning one or more business objects as the result of the query, wherein the selecting unit selects from among the business objects returned as the result of the query.

16. The system of claim 13, wherein the summary page definition file contains information relating to fields of the corresponding business object that are to be represented in the summary page.

17. The system of claim 13, wherein information displayed on the summary page may be selected so that additional information relating to the selected information may be displayed by displaying the business object or by displaying a second summary page.

18. The system of claim 13, wherein displaying the summary page based on the business object, the corresponding summary page definition file, and a user role includes selecting data from the business object to be displayed in the summary page as predetermined by the summary page definition file.

19. The system of claim 13, wherein the displaying unit displays the summary page based on the business object, the corresponding summary page definition file, and a user role by selecting data from the business object to be displayed in the summary page based on data predetermined to be relevant for a user of the particular user role.

20. The system of claim 13, wherein the displaying unit displays the summary page based on the business object, the corresponding summary page definition file, and a user role by arranging the display of data in the summary page as predetermined by the summary page definition file.

21. The system of claim 13, wherein the displaying unit displays the summary page based on the business object, the corresponding summary page definition file, and a user role by arranging the display of data in the summary page based on an arrangement predetermined to be appropriate for a user of the particular user role.

22. The system of claim 13, wherein the displaying unit displays the summary page based on the business object, the corresponding summary page definition file, and a user role by defining a navigation scheme as predetermined by the summary page definition file.

23. The system of claim 13, wherein the displaying unit displays the summary page based on the business object, the corresponding summary page definition file, and a user role by defining a navigation scheme predetermined to be appropriate for a user of the particular user role.

24. The system of claim 13, additionally comprising a personalization unit for permitting a particular user to personalize the display of the summary page.

25. The system of claim 13, wherein the summary page is presented in a graphical user interface in the display unit and includes at least one link, the link, when activated, presenting additional fields for the corresponding business object than are displayed in the summary page.

26. A computer system comprising:
a processor; and
a program storage device readable by the computer system, embodying a program of instructions executable by the processor to perform method steps for displaying one of a plurality of summary pages for a plurality of business object to a plurality of users, the method comprising:
providing access to at least one business object within a business object database;
providing access to at least one predefined summary page definition file within a definition file database, each of the summary page definition files providing information pertaining to a summary page;
querying a user database to determine that a role for the first user, the user database being different from the business object database;
prompting the user to select a desired business object from the business object database;
displaying a summary page based on the business object from the business object database, a corresponding summary page definition file from the definition file database for the user and the role of the user as determined by querying the user database, wherein different user roles have different corresponding summary pages that either include additional information or exclude information.

27. The computer system of claim 26, wherein a single database is used as the business object database and the definition file database.

28. The computer system of claim 26, wherein prior to the step of prompting the user to select a desired business object, a query is executed returning one or more business objects as the result of the query and the step of prompting the user to select a desired business object is performed from among the business objects returned as the result of the query.

29. The computer system of claim 26, wherein the summary page definition file contains information relating to fields of the corresponding business object that are to be represented in the summary page.

30. The computer system of claim 29, wherein the summary page definition file contains information relating to how represented fields are arranged.

31. The computer system of claim 26, wherein information displayed on the summary page may be selected so that additional information relating to the selected information may be displayed by displaying the business object or by displaying a second summary page.

32. The computer system of claim 26, wherein displaying the summary page based on the business object, the corresponding summary page definition file, and a user role includes selecting data from the business object to be displayed in the summary page as predetermined by the summary page definition file.

33. The computer system of claim 26, wherein displaying the summary page based on the business object, the corresponding summary page definition file, and a user role includes selecting data from the business object to be displayed in the summary page based on data predetermined to be relevant for a user of the particular user role.

34. The computer system of claim 26, wherein displaying the summary page based on the business object, the corresponding summary page definition file, and a user role includes arranging the display of data in the summary page as predetermined by the summary page definition file.

35. The computer system of claim 26, wherein displaying the summary page based on the business object, the corresponding summary page definition file, and a user role includes arranging the display of data in the summary page based on an arrangement predetermined to be appropriate for a user of the particular user role.

36. The computer system of claim 26, wherein displaying the summary page based on the business object, the corresponding summary page definition file, and a user role includes defining a navigation scheme as predetermined by the summary page definition file.

37. The computer system of claim 26, wherein displaying the summary page based on the business object, the corresponding summary page definition file, and a user role includes defining a navigation scheme predetermined to be appropriate for a user of the particular user role.

38. The computer system of claim 26, wherein the display of the summary page may be personalized for a particular user.

39. The system of claim 26, wherein the summary page is presented in a graphical user interface and includes at least one link, the link, when activated, presenting additional fields for the corresponding business object than are displayed in the summary page.

* * * * *